Patented Nov. 18, 1924.                                                    1,516,206

UNITED STATES PATENT OFFICE.

CARL PFANSTIEHL, OF HIGHLAND PARK, ILLINOIS, ASSIGNOR TO SPECIAL CHEMICALS COMPANY, OF HIGHLAND PARK, ILLINOIS, A CORPORATION OF ILLINOIS.

TOOTH-CLEANING PREPARATION.

No Drawing.          Application filed August 16, 1923. Serial No. 657,782.

*To all whom it may concern:*

Be it known that I, CARL PFANSTIEHL, a citizen of the United States, residing at Highland Park, in the county of Lake and State of Illinois, have invented a new and useful Improvement in Tooth-Cleaning Preparations, of which the following is a specification.

The present invention relates to tooth cleaning preparations and more particularly to those prepared and dispensed in the form of paste.

In carrying out the present invention, I employ a substance which, in the presence of an ionizing vehicle, such as water, forms a weak organic acid to a proportion determined by the equilibrium concentration ratio between the substance and the acid formed therefrom, the utilization or neutralization of any portion of the acid causing a further conversion of the substance to the acid to the extent determined by the equilibrium relation. Such substances I designate hereinafter as potential acids and as typical of these the anhydrids and lactones of the weak organic hydroxy acids may be pointed out. I prefer to employ the lactones of the sugar acids and more particularly of galactonic acid.

In my prior Patent No. 1,445,352, granted February 13, 1923, I have disclosed a tooth cleaning preparation comprising a non-reactive, mildly abrasive filler and a potential acid, such as a sugar acid lactone, in aqueous solution in equilibrium with its corresponding acid. These constituents are incorporated in a vehicle containing suitable body forming constituents, such as gum tragacanth, gum arabic, glycerine or the like, or mixtures thereof, and also containing, if desired, thinning agents such as alcohol.

In accordance with the present invention, in preparing such a tooth cleaning composition, I employ in it an aqueous solution of a potential acid, such as a sugar acid lactone, together with sufficient weak organic acid, preferably a fruit acid such as malic acid (natural or synthetic) or citric acid, the proportion employed being sufficient to impart an initial acidity of $pH_2$ to $pH_5$.

The proportion of lactone present is at least 1% of the entire mass. For ordinary purposes it may vary from 1 to 4%, and in special cases, where a higher degree of tartar solvent effect is desired, proportions as high as 10%, or even higher may be employed. I prefer to employ galactonic lactone, although other potential acids, particularly sugar acid lactones, may be employed. Sufficient weak organic acid is used to impart the desired initial acidity (from $pH_2$ to $pH_5$, for example) and, as an illustrative example, in the case of synthetic malic acid from 0.2 to 0.4% of the acid has been found sufficient.

The lactone and the acid are dissolved in an ionizing solvent, such as water, of which from 8 to 20% may be employed. A body forming material, such as gum tragacanth, gum arabic or the like is also incorporated into the aqueous vehicle, a suitable proportion of the gummy material being, for example, in the case of gum arabic, about 3% of the mixture used.

From 35 to 40% of a mildly abrasive non-reactive filler is employed, such as tricalcium phosphate (preferably air floated), kieselguhr or the like. Any suitable flavoring constituents, such as salt, essential oils, etc., may be incorporated. A small amount of alcohol, say from 3 to 7% may also be employed. It is to be clearly understood, of course, that these proportions are not fixed, but that variations may be made therein in accordance with the desired consistency and texture of the paste, seasonal temperature changes, etc.

In preparing the paste, the lactone, acid and gummy material may be separately dissolved in water in fairly concentrated solutions and the solutions are mixed in the required proportions and diluted to supply the desired amount of water. The other ingredients, such as the filler, glycerine, alcohol, etc. are then incorporated in the mixture, the flavoring constituents being preferably dissolved in the glycerine or the alcohol.

I claim:

1. A tooth cleaning preparation comprising an inert filler, a solution of a potential acid in an ionizing solvent and a weak organic acid to impart thereto its initial acidity.

2. A tooth cleaning preparation comprising an inert filler, an aqueous solution of galactonic lactone and a weak organic acid to impart thereto its initial acidity.

3. A tooth cleaning preparation comprising an inert filler, an aqueous solution of galactonic lactone and malic acid.

4. A tooth cleaning preparation comprising an inert filler, an aqueous solution of a potential acid, and a weak organic acid, the composition having an initial acidity of $pH_2$ to $pH_5$.

5. A tooth cleaning preparation comprising an inert filler, from 1 to 4% of galactonic lactone and sufficient weak organic acid to impart an initial acidity of from $pH_2$ to $pH_5$ to the composition.

6. A tooth cleaning preparation comprising an inert filler, an aqueous solution of a sugar acid lactone, glycerine and a weak organic acid in amount sufficient to impart an initial acidity of $pH_2$ to $pH_5$.

CARL PFANSTIEHL.